US007802046B2

(12) United States Patent  
Kowalski et al.

(10) Patent No.: US 7,802,046 B2  
(45) Date of Patent: Sep. 21, 2010

(54) METHOD AND APPARATUS FOR A FEDERATION CONTROL PLANE IN AN ORTHOGONAL SYSTEM

(75) Inventors: Bobby Jim Kowalski, Vadnais Heights, MN (US); Ronald R. Denny, Brooklyn Center, MN (US)

(73) Assignee: General Dynamics Advanced Information Systems, Inc., Fairfax, VA (US)

( * ) Notice: Subject to any disclaimer, the term of this patent is extended or adjusted under 35 U.S.C. 154(b) by 101 days.

(21) Appl. No.: 12/068,504

(22) Filed: Feb. 7, 2008

(65) Prior Publication Data

US 2008/0276031 A1 Nov. 6, 2008

Related U.S. Application Data

(60) Provisional application No. 60/899,875, filed on Feb. 7, 2007.

(51) Int. Cl.
*G06F 13/40* (2006.01)
(52) U.S. Cl. ..................................... 710/313
(58) Field of Classification Search ......... 710/300–317, 710/2, 104, 110
See application file for complete search history.

(56) References Cited

U.S. PATENT DOCUMENTS

| | | | | |
|---|---|---|---|---|
| 4,237,546 A * | 12/1980 | Wells | .......................... | 710/100 |
| 4,708,660 A | 11/1987 | Claeys et al. | | |
| 4,876,630 A | 10/1989 | Dara | | |
| 5,306,171 A | 4/1994 | Marshall | | |
| 5,325,488 A | 6/1994 | Carteau et al. | | |
| 5,887,158 A | 3/1999 | Sample et al. | | |
| 5,953,741 A | 9/1999 | Evoy et al. | | |
| 6,253,266 B1 * | 6/2001 | Ohanian | ...................... | 710/301 |
| 6,487,102 B1 | 11/2002 | Halbert et al. | | |
| 6,496,892 B1 * | 12/2002 | Lake et al. | ................... | 710/301 |
| 6,608,762 B2 | 8/2003 | Patriche | | |
| 6,763,417 B2 * | 7/2004 | Paul et al. | .................... | 710/316 |
| 6,890,184 B2 | 5/2005 | Doblar et al. | | |
| 6,922,342 B2 | 7/2005 | Doblar et al. | | |
| 6,988,162 B2 * | 1/2006 | Goergen | ...................... | 710/317 |
| 7,050,307 B2 | 5/2006 | Doblar et al. | | |
| 7,080,284 B1 | 7/2006 | Zeevi et al. | | |
| 7,281,063 B2 * | 10/2007 | Benson et al. | .................. | 710/2 |
| 7,289,319 B2 * | 10/2007 | Garnett et al. | ......... | 361/679.41 |
| 7,296,106 B2 * | 11/2007 | Doblar et al. | ............... | 710/302 |

(Continued)

FOREIGN PATENT DOCUMENTS

WO WO 2004/003762 1/2004

OTHER PUBLICATIONS

A printout from http://en.wikipedia.org/wiki/Cache-coherency on Feb. 7, 2008.

(Continued)

*Primary Examiner*—Raymond N Phan
(74) *Attorney, Agent, or Firm*—Steptoe & Johnson LLP

(57) ABSTRACT

A method of and architecture for controlling board elements in an orthogonal system architecture is provided. The method and architecture preferably utilize an internal bus architecture between control boards, such that a first control board can access board elements in its stack via I/O on a second control board and the second control board can access board elements in its stack via I/O on the first control board. Most preferably the internal bus architecture is a HyperTransport bus architecture.

24 Claims, 8 Drawing Sheets

U.S. PATENT DOCUMENTS

| | | |
|---|---|---|
| 7,418,525 B2 * | 8/2008 | Dalton et al. ................... 710/5 |
| 7,475,175 B2 * | 1/2009 | Klein et al. ................. 710/100 |
| 2003/0037224 A1 | 2/2003 | Oehler et al. |
| 2003/0142483 A1 * | 7/2003 | Iny ............................ 361/788 |
| 2004/0001303 A1 | 1/2004 | Doblar et al. |
| 2004/0003158 A1 | 1/2004 | Doblar et al. |
| 2004/0203259 A1 | 10/2004 | Doblar et al. |

OTHER PUBLICATIONS

A printout from http://www.hypertransport.org/tech_htthree.cfm on Feb. 7, 2008.

PCT Search Report.

\* cited by examiner

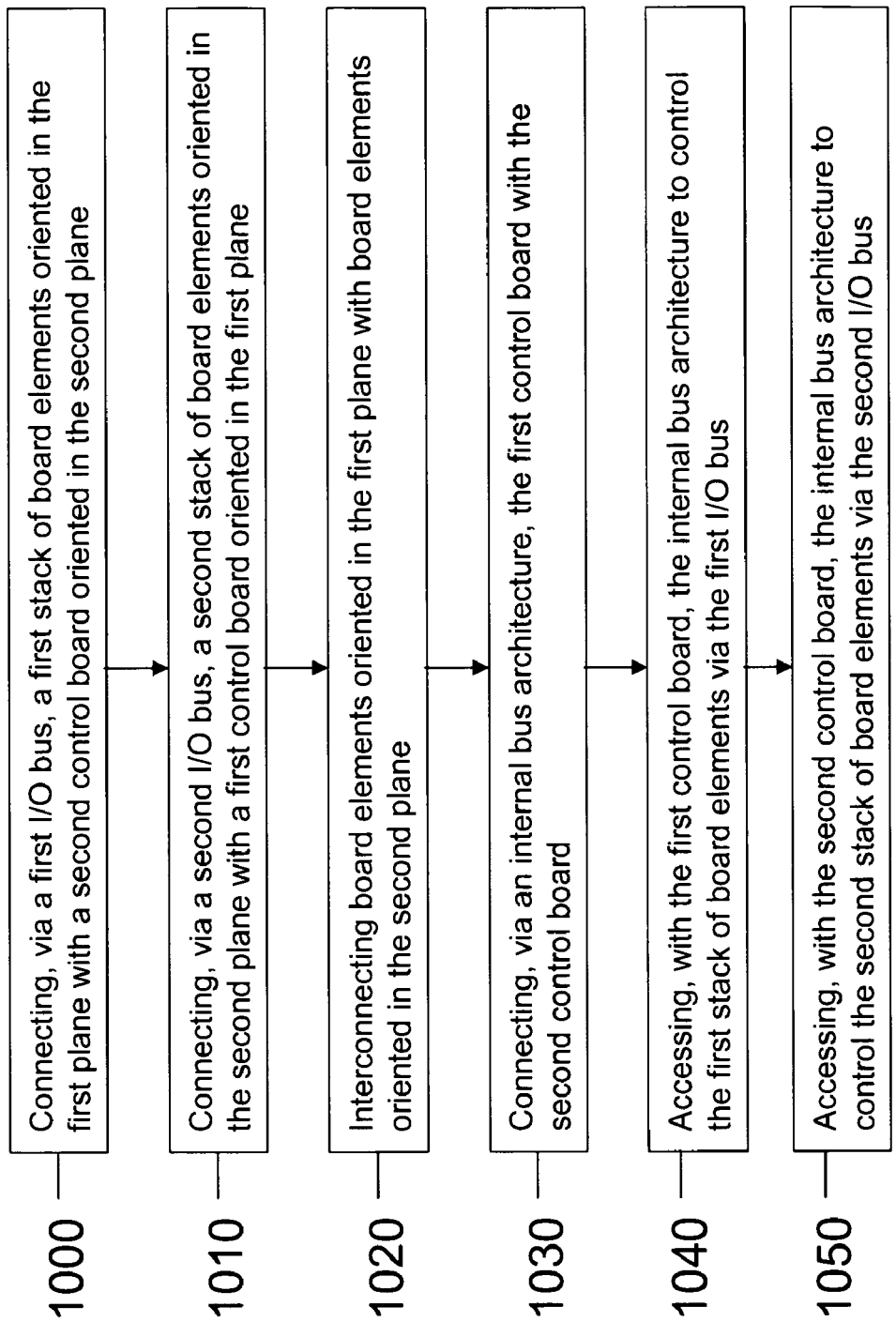

METHOD AND APPARATUS FOR A FEDERATION CONTROL PLANE IN AN ORTHOGONAL SYSTEM

RELATED APPLICATIONS

This invention claims the benefit of and priority to U.S. Provisional Patent Application No. 60/899,875, the entire contents of which are incorporated by reference herein in its entirety.

FIELD OF THE INVENTION

This invention relates generally to orthogonal system architectures which preferably employ at least two substantially identical stacks of board elements, one stack being orientated in the substantially horizontal plane, and one stack being orientated in the substantially vertical plane, the stacks being interconnected directly using connector technology. More specifically, this invention relates to a control plane architecture for use in an orthogonal system architecture, the control plane architecture comprising at least one control board per stack of board elements with an internal bus architecture extending between control boards of different stacks.

BACKGROUND OF THE INVENTION

Computer systems are well known in the art. One example of such a system is described in U.S. Published Application No. 2004/0003158 (Doblar), which is incorporated by reference herein in its entirety. Other examples also exist.

In general, an orthogonal system architecture typically employs two identical stacks of board elements, a first stack 130 orientated in the vertical plane, and a second stack 140 orientated in the horizontal plane. Such a configuration is shown, for example, in FIG. 1. The two stacks 130, 140 of the orthogonal system architecture shown in FIG. 1 are preferably interconnected directly using connector technology, rather than employing cable harnesses and the like. In such a configuration, the orthogonal structure provides a connector based interface from each board element in the vertical first stack 130 to each board element in the horizontal second stack 140.

While the unique interconnect approaches of orthogonal system architectures has yielded improvements in communication fabric construction over non-orthogonal system architectures, it has also imposed cumbersome control plane architectures in some applications. As used herein, the term "control plane architecture" refers to those components that provide management functions for stacks 130, 140 of board elements. Examples of management functions include control of electrical power to individual board elements, monitoring of environmental sensors (humidity, temperature, etc), surrogate board element initialization and control functions, and/or any other capabilities that support one or more of the mission goals of the particular orthogonal system being implemented.

Existing approaches for providing control plane architectures "wrap" the control plane around the orthogonal structure of processing planes, which has required deployment of networks of control elements and/or external control servers to support the wrapped control plane architecture. As such, these approaches have led to cabling challenges and have required elaborate communications architectures to provide the control capability described above. Further, these approaches can suffer from communication delays and synchronization errors, and from dropped or corrupted packets traversing the associated networking.

A need thus exists for an improved orthogonal system architecture that eliminates or reduces one or more problems with existing control plane architectures. Other advantages and features may also be achieved using one or more embodiments of the present invention as would be readily understood by those of skill in the art after reading this disclosure.

BRIEF DESCRIPTION OF THE DRAWINGS

FIG. 7 is a flow chart of a method of controlling processor boards in an orthogonal system architecture according to an embodiment of the present invention.

DETAILED DESCRIPTION OF THE EXEMPLARY EMBODIMENTS

As illustrated in the discussion below, various embodiments of the present invention are directed at aspects of an orthogonal system architecture. For illustration and explanation purposes, the same reference numbers will generally be used throughout the drawings to refer to the same or like parts.

Figure 1:
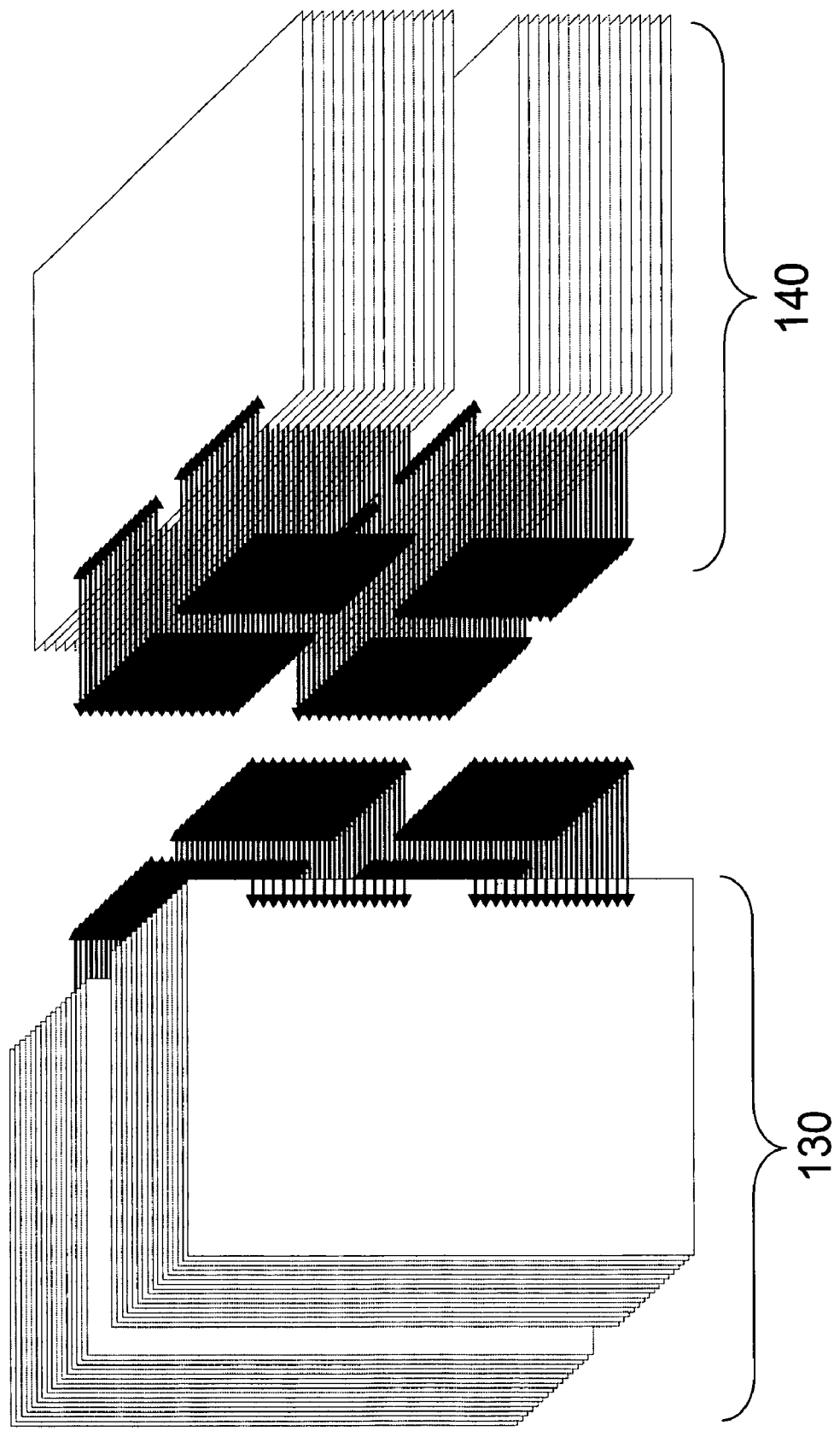
FIG. 1 is perspective view of an orthogonal system architecture with two stacks of board elements angled relative to one another by about ninety degrees according to an embodiment of the present invention.
Figure 2:
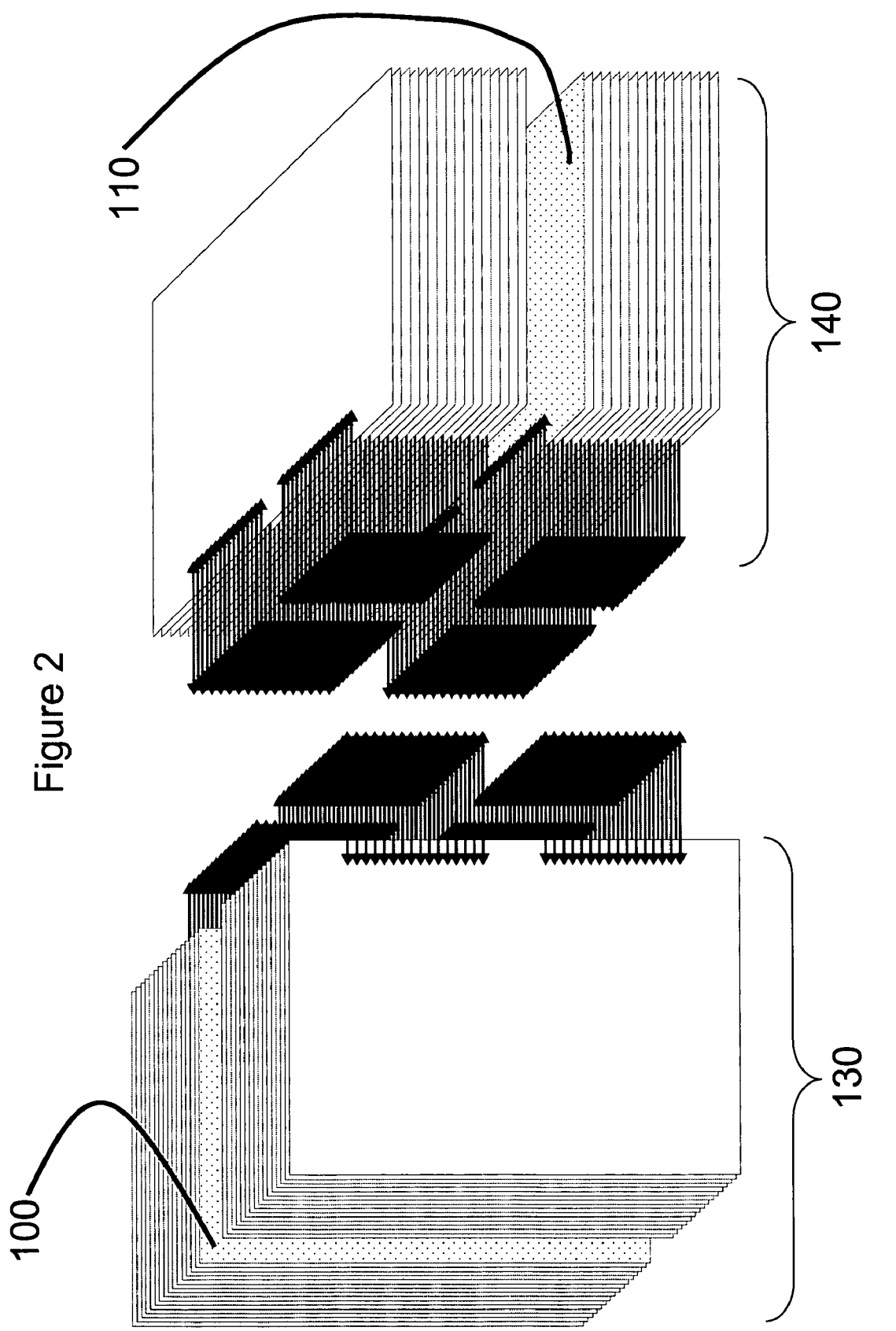
FIG. 2 is a perspective view of an orthogonal system architecture including a first and a second control board and a plurality of processing boards according to an embodiment of the present invention.

FIG. 2 illustrates a control plane architecture for an orthogonal system architecture according to an embodiment of the present invention. Preferably, the control plane architecture of this embodiment includes a first control board 100 oriented in the first plane (see vertical first stack 130) and a second control board 110 oriented in the second plane (see horizontal second stack 140). The control boards 100, 110 can be oriented at substantially a midpoint of their respective stacks 130, 140, or at some other location within the stacks 130, 140 as would be understood by those of skill in the art after reading this disclosure. The remaining boards in first stacks 130, 140 preferably comprise processor boards oriented in the first plane and second plane respectively. Other boards could also be provided in first stack 130 and/or second stack 140, either in place of or in conjunction with the processors boards.

According to an embodiment of the present invention, the two control boards 100, 110 are substantially identical. For example, the two control boards 100, 110 may be identical with respect to containing a symmetrical number of processors. Such a configuration minimizes manufacturing and warehousing costs, as only one type of control board 100, 110 is required. Alternatively, the two control boards 100, 110 may differ. For example, the two control boards 100, 110 may contain a different number of processors (e.g., with no processors provided on one of the two control boards 100, 110). However, whether the control boards 100, 110 differ or are identical, the present embodiment utilizes at least one control board 100, 110 per stack 130, 140 oriented parallel to other boards in the same stack 130, 140.

Figure 3A:
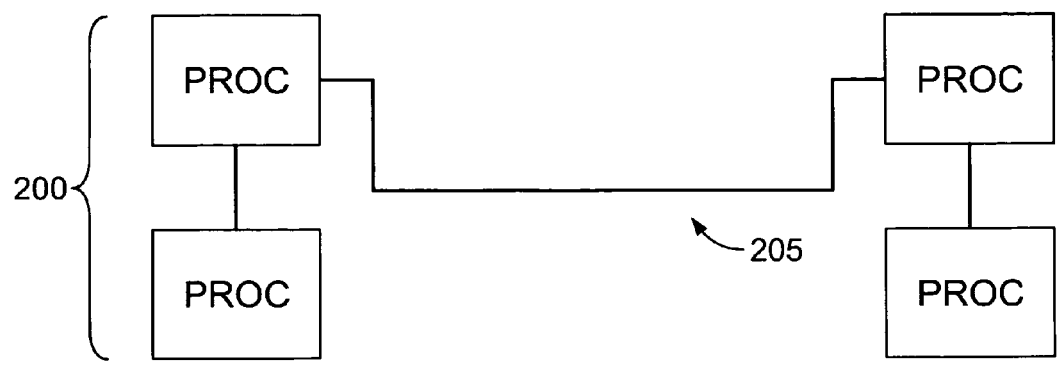
FIG. 3A is a logical view of a single control plane system according to an embodiment of the present invention.
Figure 3B:
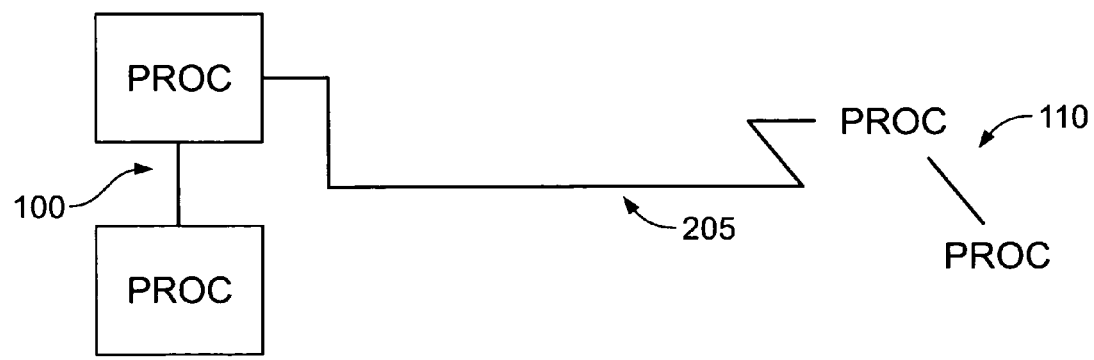
FIGS. 3B and 3C depict a logical view of two control boards with an internal bus architecture there between according to an embodiment of the present invention.
Figure 3C:
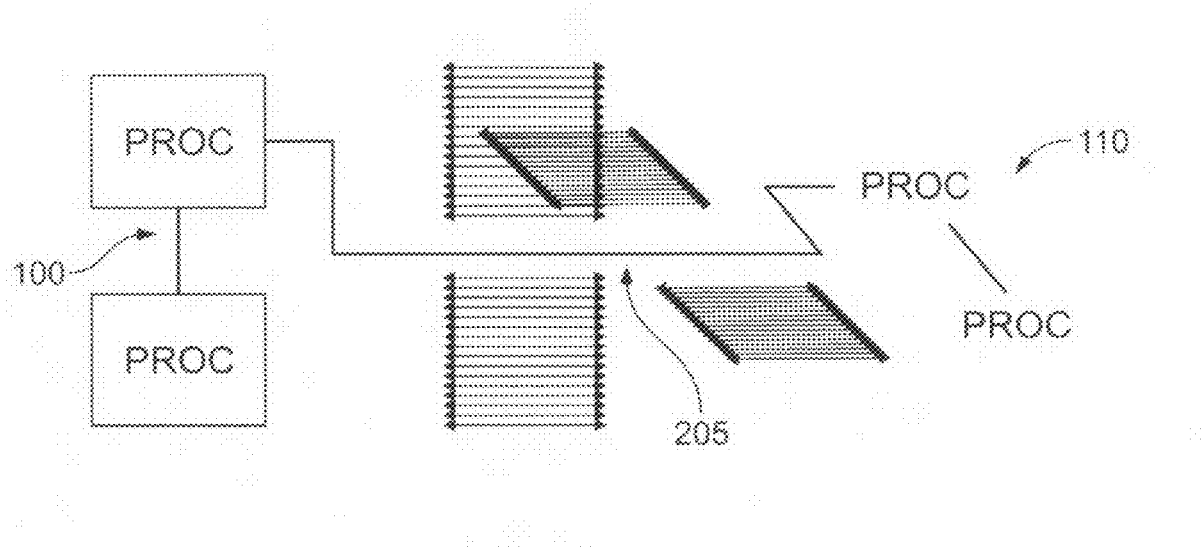

In the control plane architecture of the present embodiment, a bus 205 is extended between the control boards 100, 110. As shown in FIGS. 3B & 3C, bus 205 may be provided across one or more orthogonal connectors that provide an electrical interface between boards in the first and second stacks 130, 140. Rather than having two independent boards 100, 110 communicating across an external communications network as in known systems, the bus 205 of the present embodiment allows the two control boards 100, 110 to act as a single control computer at the logical and/or physical center of the system. In brief, bus 205 allows the control plane architecture of the present embodiment to appear—from a logical perspective—to be a single unified control board 200 as shown in FIG. 3A. In other words, the control plane architecture creates an external view of the orthogonal system as a conventional multi-processor commercial server rather than as a multi-server. This control plane architecture thus eliminates the need for elaborate communication architectures or complex cabling to provide the desired control capability.

Control Board Examples

To better explain various aspects of the present invention, exemplary control board layouts are described below. It should be appreciated, however, that other control board layouts may also take advantage of and benefit from various embodiments of the present invention. Thus, the examples provided below are introduced solely for illustration purposes.

Figure 4:
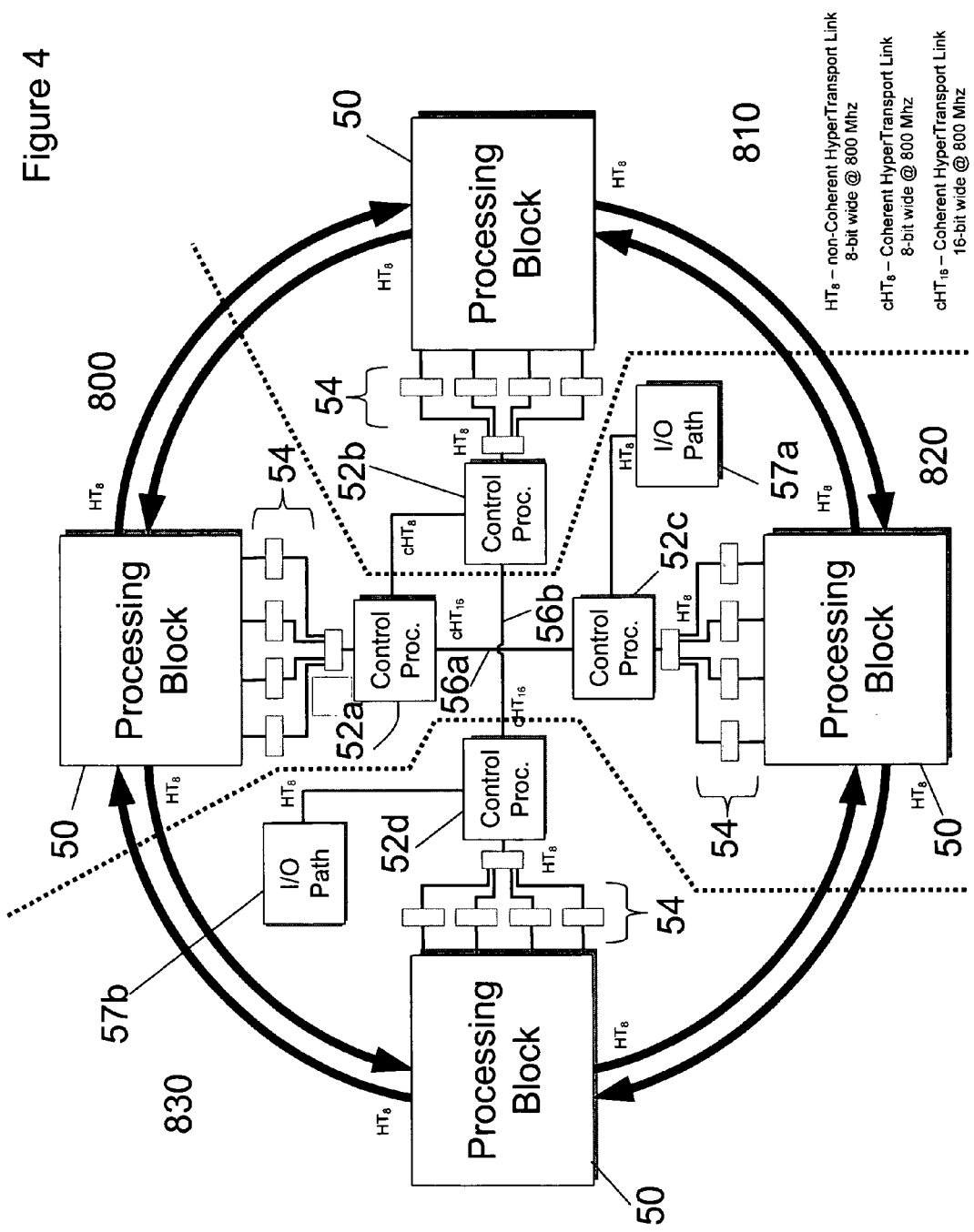
FIG. 4 is a logical view of two control boards and associated processing boards according to an embodiment of the present invention.

In the embodiment shown in FIG. 4, two physically separate and discrete control boards are shown along with the processing boards they are in communication with. The first control board is represented by elements depicted in quadrants 800 and 820. The second control board is represented by elements depicted in quadrants 810 and 830. As will be described in greater detail below, the two control boards are interconnected by an internal bus architecture shown in FIG. 4 as extending between control processor 52a and control processor 52b. In the embodiment of FIG. 3C, the corresponding bus is labeled 205.

Each of the two control boards shown in FIG. 4 are substantially identical in accordance with an embodiment of the present invention. Starting first with the control board depicted in quadrants 800 and 820, it should be appreciated that two processing blocks 50 are also depicted with one in each of quadrants 800 and 820. A "processing block" herein refers to one or more Central Processing Units (CPU) on a processor board in the opposing stack. As an example, if the control board shown in quadrants 800 and 820 represents control board 100 in FIG. 2, then the processing blocks 50 in quadrants 800 and 820 correspond to processor boards in stack 140. The control board represented by quadrants 800, 820 preferably does not have a direct path to board elements in the same stack as the control board. Rather, as will be described in greater detail below, communication between the control board depicted in quadrants 800, 820 and same stack board elements (e.g., processors on a processing board) is provided by the opposing control board depicted in quadrants 810, 830.

Each processing block 50 is preferably connected to one of two control processors 52a, 52c by an eight bit wide non-coherent bus 54. One of skill in the art will appreciate the differences between a coherent and a non-coherent bus, and the substitutability thereof, as referenced at http://en.wikipedia.org/wiki/Cache_coherency. The two control processors 52a, 52c may, for example, comprise individual control AMD Opteron processors. The two control processors 52a, 52c are, in turn, preferably connected by a sixteen bit wide coherent bus 56a.

At least one of the two control processors 52a, 52c preferably includes an I/O path 57a. In the embodiment shown in FIG. 4, I/O Path 57a is electrically connected to control processor 52c. I/O Path 57a may be electrically connected to control processor 52c by an eight bit wide non-coherent bus or the like. The I/O Path 57a may be used to interconnect the control board depicted in quadrants 800, 820 with external devices, such as a disk drive or the like.

Turning now to the control board depicted in quadrants 810, 830, this board is substantially identical to the control board depicted in quadrants 800, 820. Two processing blocks 50 are provided, one in each of quadrants 810, 830, each processing block 50 having an associated control processor 52b, 52d. As with the opposing control board, the processing blocks 50 are connected to the control processors 52b, 52d by an eight bit wide non-coherent bus 54. The two control processors 52b, 52d are, in turn, preferably connected by a sixteen bit wide coherent bus 56b. As similarly described above with respect to the control board depicted in quadrants 800 and 820, the processing blocks 50 shown in quadrants 810, 830 correspond to processor boards (or processors thereon) in an opposing stack as the control board shown in quadrants 810, 830. In other words, if the control board shown in quadrants 810, 830 represents control board 110 in FIG. 2, the processing blocks 50 shown in quadrants 810, 830 correspond to processing boards in stack 130. The control board shown in quadrants 810, 830 preferably does not have a direct connection to processing boards in the same stack, and instead relies on the control board 800, 820 to provide such a connection.

As shown in FIG. 4, one of the two control processors 52b, 52d is electrically connected to an I/O Path 57b. In the embodiment shown in FIG. 4, I/O Path 57b is electrically connected to control processor 52d. I/O Path 57b may be electrically connected to control processor 52d by an eight bit wide non-coherent bus or the like. The I/O Path 57b may be used to interconnect the board depicted in quadrants 810, 830 with external devices, such as a hard disk drive or the like.

Figure 5:
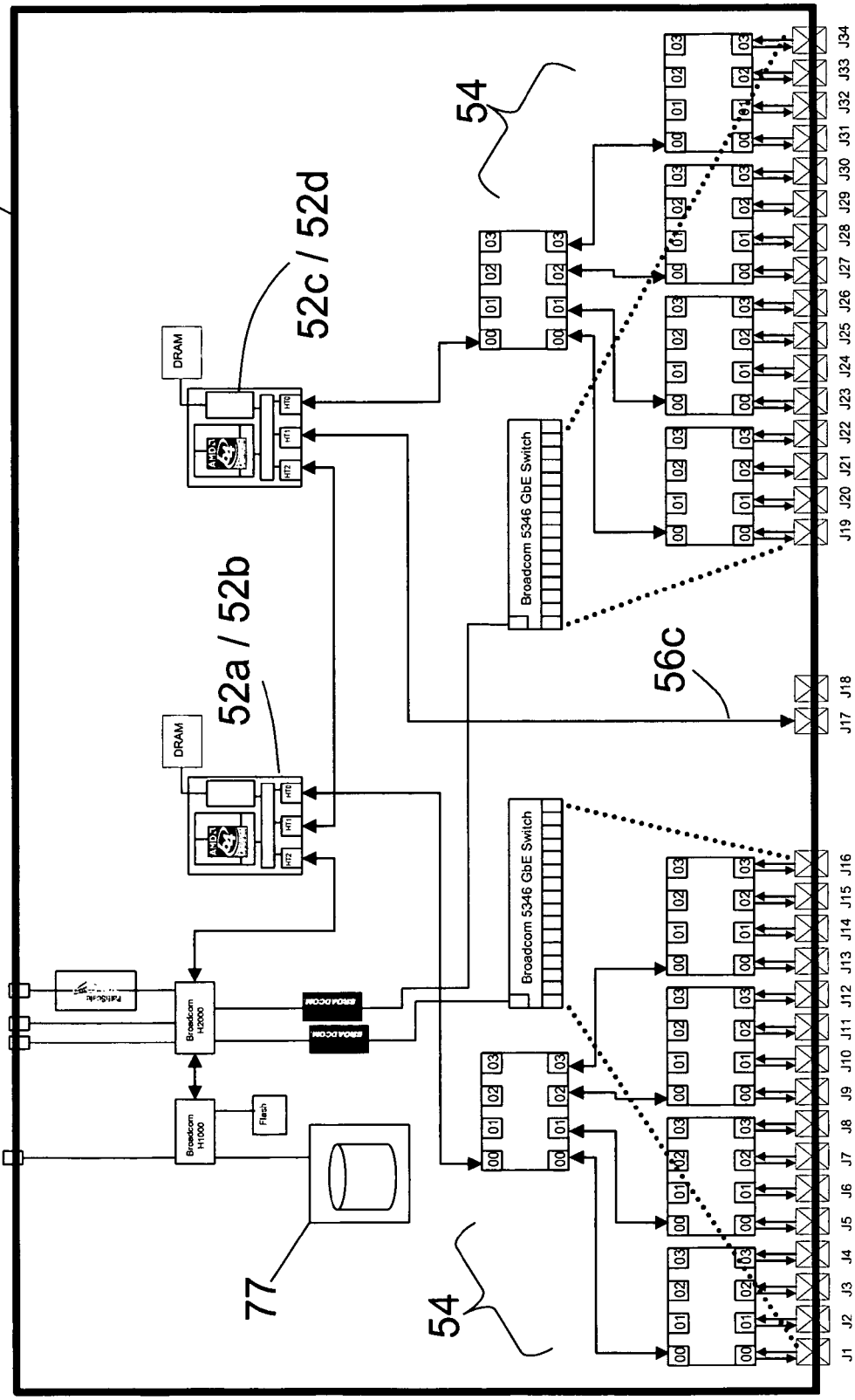
FIG. 5 is a simplified view of a portion of a control board according to an embodiment of the present invention.

Aspects of the embodiment described above are further illustrated in FIG. 5. In particular, FIG. 5 shows the interconnection between control processors 52a/52b and 52c/52d respectively. FIG. 5 further shows the bus 54 that connects control processors 52a-d to associated processor blocks 50 (not shown). Additional supporting devices depicted include an on-board rotating disk 77, flash memory, DRAM, switching technology, etc. Other devices may also be provided as needed.

Significantly, the embodiment shown in FIG. 5 includes bus 56c. Bus 56c acts as an internal bus architecture between the first control board (depicted in quadrants 800, 820 of FIG. 4) and the second control board (depicted in quadrants 810, 830 of FIG. 4). The bus 56c allows the first control board to control the first stack of board elements via the I/O bus 54 on the second control board and allows the second control board to control the second stack of board elements via the I/O bus 54 on the first control board. Preferably, the bus 56c comprises a HyperTransport bus architecture. In particular, the bus 56c may be provided in accordance with the HyperTransport 3.0 standard. Information about the HyperTransport 3.0 standard is available at http://www.hypertransport.org/tech/tech_htthree.cfm, which is incorporated by reference herein in its entirety.

Most preferably, the bus 56*c* comprises a sixteen bit wide HyperTransport link. Other bus architectures could also be used, as would be readily understood by those of skill in the art after reading the present application.

Processor Board Examples

While it should be appreciated that one or more of the aforementioned control board embodiments can be utilized in a variety of settings, an embodiment of the present invention is directed at an orthogonal system including two control boards and a plurality of processor boards. Such an application could, for example, utilize up to thirty-four processor boards per stack. More preferably, however, each stack of board elements comprises thirty-two processor boards.

Figure 6:
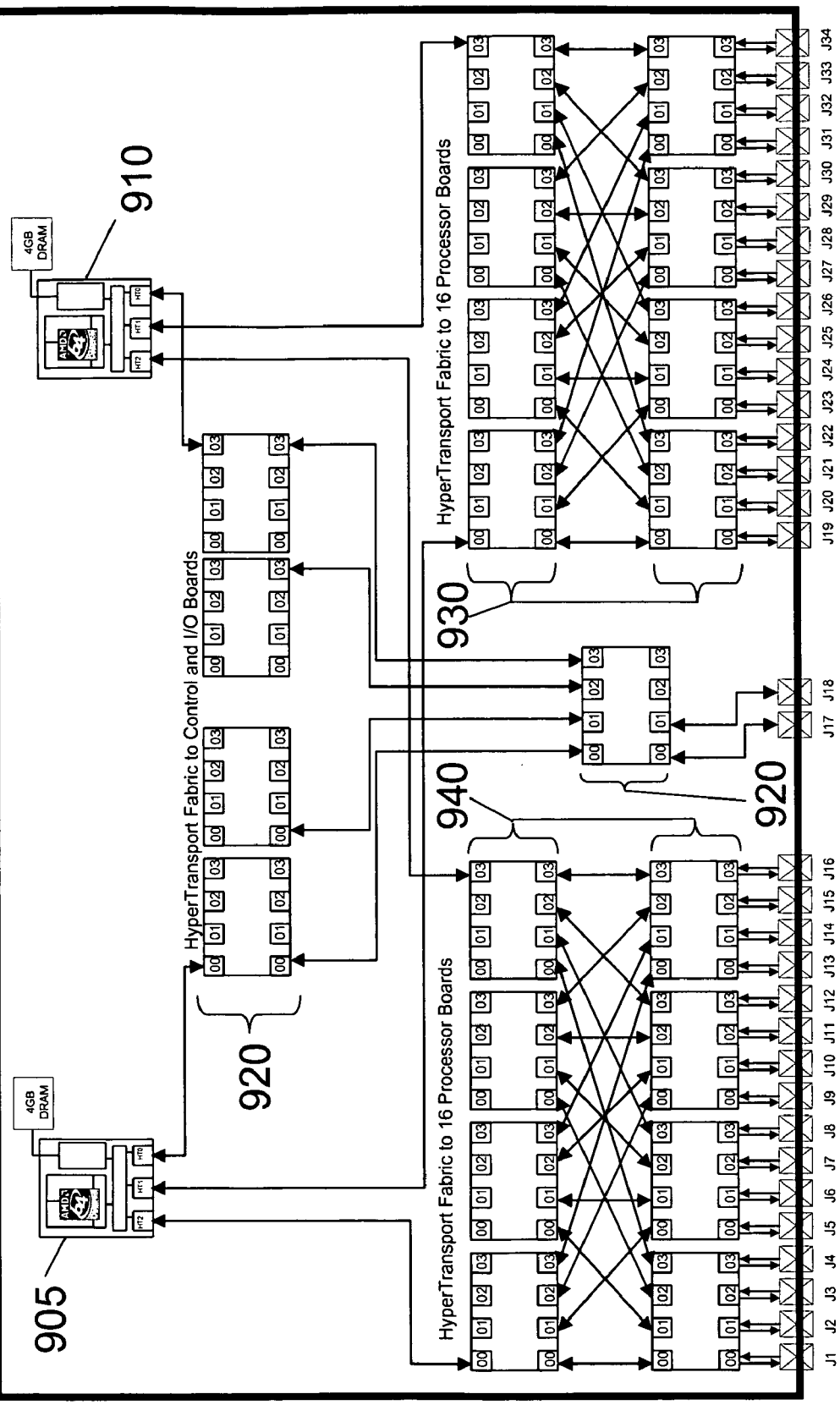
FIG. 6 is a logical view of a processor board according to an embodiment of the present invention.

Different processor board layouts may be utilized depending on the particular application at hand. In one embodiment, each processor board includes thirty-two processor cores (e.g., in dual core Opteron processors) with sixty-four gigabytes of DDR memory. In the embodiment shown in FIG. 6, two processors 905, 910 are shown on processor board 900, each processor 905, 910 having 4 GB of associated DRAM. Preferably, each processor 905, 910 is electrically connected to a first, second and third switch fabric 920, 930, 940 via an internal processor bus architecture. The first switch fabric 920 provides support for external I/O capabilities and control board communications. The second and third switch fabrics 930, 940 provide communication channels to orthogonally connected processor boards. In other words, the second and third switch fabrics 930, 940 interconnect processor boards 900 in a first stack 130 with corresponding processor boards 900 in a second stack 140. Preferably, the internal processor bus architecture is a HyperTransport bus architecture, similar if not identical to bus 56*c* of the control boards 100, 110.

Method of Operation

A method of controlling processor boards (or other boards) in an orthogonal system architecture according to another embodiment of the present invention will now be described in reference to FIG. 7. As an example, this method could be used with the previously described processor board 900 and control boards 100, 110.

As shown in step 1000 the method first connects, via a first I/O bus, a first stack of board elements oriented in a first plane with a second control board oriented in a second plane (with the second plane preferably being substantially orthogonal to the first plane). For example, step 1000 may relate to connecting board elements in stack 130 with control board 110 using I/O bus 54 on control board 110.

As shown in step 1010, the method next connects, via a second I/O bus, a second stack of board elements oriented in the second plane with a first control board oriented in the first plane. For example, step 1010 may relate to connecting board elements in stack 140 with control board 100 using I/O bus 54 on control board 100.

As shown in step 1020, the method next interconnects board elements oriented in the first plane with board elements oriented in the second plane. For example, step 1020 may relate to using a connector (e.g., a bowtie connector) that provides an electrical interface between board elements in the first plane with board elements in the second plane. Preferably, step 1020 is performed without the use of complex cabling and the like.

As shown in step 1030, the method next connects, via an internal bus architecture, the first control board with the second control board. For example, step 1030 may relate to providing a HyperTransport bus 56*c* between control processors 52*a*, 52*b* on two distinct control boards 100, 110. Preferably, step 1030 is performed without the use of overhead network components—e.g., by using two different set of addresses for the two respective boards that provides for direct peering through via the bus.

After steps 1000 to 1030 have been performed, steps 1040 and 1050 can be performed as needed (whether in series, in an opposite series to that shown, or in parallel). As shown in step 1040, the method accesses, with the first control board, the internal bus architecture to control the first stack of board elements via the first I/O bus. For example, step 1040 may relate to control board 100 controlling processor boards 900 in stack 130 by using HyperTransport bus 56*c* to use I/O bus 54 of control board 110. Step 1040 is preferably performed in this manner because control board 100 lacks a direct physical connection to processor boards 900 in the same stack 130.

As shown in step 1050, the method accesses, with the second control board, the internal bus architecture to control the second stack of board elements via the second I/O bus. For example, step 1050 may relate to control board 110 controlling processor boards 900 in stack 140 by using HyperTransport bus 56*c* to use I/O bus 54 of control board 100. Step 1050 is preferably performed in this manner because control board 110 lacks a direct physical connection to processor boards 900 in the same stack 140.

While the aforementioned steps 1000 to 1050 have been described, it should be appreciated that additional steps may be added. Further, steps may be modified or removed in some applications. Other methods may also benefit from one or more of the embodiments described in the present application.

Variations are Contemplated

The foregoing description of various embodiments of the present invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated.

What is claimed is:

1. A system architecture comprising:
   a first stack of board elements, each board element of said first stack being aligned in parallel with a first plane;
   a first control board aligned in parallel with the first plane;
   a second stack of board elements, each board element of the second stack being aligned in parallel with the second plane, the second plane being at non-zero angle relative to the first plane;
   a second control board aligned in parallel with the second plane, the second control board having an I/O bus to board elements aligned in parallel with the first plane;
   a connector providing an electrical interface between the first and second board elements; and
   an internal bus architecture between the first and second control boards, the internal bus architecture allowing the first control board to control the first stack of board elements via the I/O bus on the second control board and allowing the second control board to control the second stack of board elements via the I/O bus on the first control board.

2. The system architecture of claim 1, wherein the first and second control board collectively form a single control plane system with direct processor to processor communications across the internal bus architecture between the first and second control boards.

3. The system architecture of claim 1, wherein the stacks of board elements comprise processor boards.

4. The system architecture of claim 1, wherein more processors are provided on the first control board than on the second control board.

5. The system architecture of claim 1, wherein a symmetrical number of processors are provided on the first and second control boards.

6. The system architecture of claim 1, wherein the internal bus architecture between the first and second control boards comprises a HyperTransport bus architecture.

7. The system architecture of claim 1, wherein the first and second control boards include AMD Opteron processors.

8. The system architecture of claim 1, wherein the system architecture includes only two stacks of board elements.

9. The system architecture of claim 1, wherein the first plane is oriented about 90° relative to the second plane.

10. The system architecture of claim 1, further comprising:
the first and second stacks of board elements comprise processor boards;
the first plane is orthogonal to the second plane, such that the first stack of board elements is orthogonal to the second stack of board elements;
wherein each board element of the first stack connects directly to each board element of the second stack; and
wherein each board element of the second stack connects directly to each board element of the first stack.

11. The system architecture of claim 3, wherein each stack of board elements comprises thirty-two processor boards.

12. The system architecture of claim 3, wherein each processor board comprises at least thirty-two processor cores with at least sixty-four gigabytes of DDR memory.

13. The system architecture of claim 3,
wherein each processor board includes a plurality of processors,
wherein each processor is electrically connected to a first, second and third switch fabric via an internal processor bus architecture,
wherein the first switch fabric provides support for external I/O capabilities and control board communications, and
wherein the second and third switch fabrics provide communication channels to orthogonally connected processor boards.

14. The system architecture of claim 13, wherein the internal processor bus architecture comprises a HyperTransport bus architecture.

15. A system architecture comprising:
a first stack of board elements oriented in a first plane;
a first control board oriented in the first plane, the first control board having an I/O bus to board elements oriented in a second plane;
a second stack of board elements oriented in the second plane, the second plane being at an angle relative to the first plane;
a second control board oriented in the second plane, the second control board having an I/O bus to board elements oriented in the first plane;
a connector providing an electrical interface between the first and second board elements; and
an internal bus architecture between the first and second control boards, the internal bus architecture allowing the first control board to control the first stack of board elements via the I/O bus on the second control board and allowing the second control board to control the second stack of board elements via the I/O bus on the first control board
wherein the each of the first and second control boards comprise:
a first processing block comprising a first plurality of processors;
a first control processor electrically connected to the first processing block via a first non-coherent internal bus architecture;
a second processing block comprising a second plurality of processors;
a second control processor electrically connected to the second processing block via a second non-coherent internal bus architecture; and
a first coherent internal bus architecture electrically connecting the first control processor to the second control processor.

16. The system architecture of claim 15, wherein the I/O bus of a given control board electrically connects to the first control processor via a second coherent internal bus architecture.

17. The system architecture of claim 16,
wherein first coherent internal bus architecture is sixteen bits wide,
wherein the first non-coherent internal bus architecture is eight bits wide,
wherein the second non-coherent internal bus architecture is eight bits wide, and
wherein the second coherent internal bus architecture is eight bits wide.

18. The system architecture of claim 16,
wherein first coherent internal bus architecture comprises a HyperTransport link,
wherein the first non-coherent internal bus architecture comprises a HyperTransport link,
wherein the second non-coherent internal bus architecture comprises a HyperTransport link, and
wherein the second coherent internal bus architecture comprises a HyperTransport link.

19. A first control board for use in a system architecture, the first control board being aligned in parallel with a first plane and comprising:
a first I/O bus adapted and configured to electrically connect the first control board aligned in parallel with a first plane to a second stack of board elements aligned in parallel with a second plane, the second plane being angled at a non-zero angle relative to the first plane; and
an internal bus architecture adapted and configured to connect processors in the first control board with processors in a second control board, the second control board being aligned in parallel with the second plane,
wherein the internal bus architecture is adapted and configured to allow the first control board to control a first stack of board elements via a second I/O bus on the second control board, and
wherein the internal bus architecture is adapted and configured to allow the second control board to control the second stack of board elements via the first I/O bus.

20. The first control board of claim 19, further comprising:
the first and second stacks of board elements comprise processor boards;
the first plane is orthogonal to the second plane, such that the first stack of board elements is orthogonal to the second stack of board elements;
wherein each board element of the first stack connects directly to each board element of the second stack; and wherein each board element of the second stack connects directly to each board element of the first stack.

21. A method of controlling processor boards in system architecture having first and second planes angled at a non-zero angle relative to one another, the method comprising:

connecting, via a first I/O bus, a first stack of board element, each board element of said first stack being aligned in parallel with the first plane, with a second control board aligned in parallel with the second plane;

connecting, via a second I/O bus, a second stack of board elements, each board element of said second stack being aligned in parallel with the second plane, with a first control board aligned in parallel with the first plane;

interconnecting board elements oriented in the first plane with board elements oriented in the second plane;

connecting, via an internal bus architecture, the first control board with the second control board;

accessing, with the first control board, the internal bus architecture to control the first stack of board elements via the first I/O bus; and accessing, with the second control board, the internal bus architecture to control the second stack of board elements via the second I/O bus.

22. The method of claim 21, further comprising:

the first and second stacks of board elements comprise processor boards;

the first plane is orthogonal to the second plane, such that the first stack of board elements is orthogonal to the second stack of board elements;

wherein each board element of the first stack connects directly to each board element of the second stack; and wherein each board element of the second stack connects directly to each board element of the first stack.

23. An system architecture comprising:

means for connecting a first stack of board elements, each board element of said first stack being aligned in parallel with a first plane with a second control board aligned in parallel with a second plane, the first plane being angled at a non-zero relative to the second plane;

means for connecting a second stack of board elements aligned in parallel with the second plane with a first control board aligned in parallel with the first plane;

means for interconnecting board elements aligned in parallel with the first plane with board elements aligned in parallel with the second plane;

means for connecting the first control board with the second control board;

means for controlling the first stack of board elements with the first control board; and means for controlling the second stack of board elements with the second control board.

24. The system architecture of claim 23, further comprising:

the first and second stacks of board elements comprise processor boards;

the first plane is orthogonal to the second plane, such that the first stack of board elements is orthogonal to the second stack of board elements;

wherein each board element of the first stack connects directly to each board element of the second stack; and wherein each board element of the second stack connects directly to each board element of the first stack.

* * * * *